United States Patent
Andel et al.

(10) Patent No.: US 8,103,099 B2
(45) Date of Patent: Jan. 24, 2012

(54) METHOD AND SYSTEM FOR RECOGNIZING CHARACTERS AND CHARACTER GROUPS IN ELECTRONICALLY REPRESENTED TEXT

(75) Inventors: Richard S. Andel, Binghamton, NY (US); Matthew T. Butt, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 861 days.

(21) Appl. No.: 12/173,362

(22) Filed: Jul. 15, 2008

(65) Prior Publication Data

US 2010/0014757 A1    Jan. 21, 2010

(51) Int. Cl.
G06K 9/00 (2006.01)
G06K 9/46 (2006.01)
G06K 9/66 (2006.01)

(52) U.S. Cl. ......... 382/181; 382/190; 382/296; 382/301
(58) Field of Classification Search .................. 382/181, 382/190, 296, 301
See application file for complete search history.

(56) References Cited

U.S. PATENT DOCUMENTS

| | | | |
|---|---|---|---|
| 5,103,489 A | 4/1992 | Miette | |
| 5,235,651 A | 8/1993 | Nafarieh | |
| 5,734,723 A | 3/1998 | Windel et al. | |
| 6,137,905 A | 10/2000 | Takaoka | |
| 6,151,423 A | 11/2000 | Melen | |
| 6,249,604 B1 | 6/2001 | Huttenlocher et al. | |
| 6,738,496 B1 | 5/2004 | Van Hall | |
| 7,151,860 B1 * | 12/2006 | Sakai et al. | 382/297 |
| 7,286,718 B2 | 10/2007 | Aradhye | |
| 7,298,920 B2 | 11/2007 | Zuniga | |
| 2002/0054693 A1 | 5/2002 | Elmenhurst | |
| 2003/0169900 A1 | 9/2003 | Woolston et al. | |
| 2005/0105766 A1 | 5/2005 | Fesquet et al. | |
| 2005/0123170 A1 | 6/2005 | Desprez et al. | |
| 2005/0163340 A1 | 7/2005 | Lindwurm et al. | |

FOREIGN PATENT DOCUMENTS

WO    WO 87/02602    5/1987

* cited by examiner

Primary Examiner — John Strege
(74) Attorney, Agent, or Firm — Burns & Levinson, LLP; Jacob N. Erlich, Esq.; Orlando Lopez, Esa.

(57) ABSTRACT

A system and method for automatically recognizing words or phrases in text.

16 Claims, 5 Drawing Sheets

MAILED FROM ZIP CODE 60599

FIG. 3A

MAILED FROM    ZIP CODE 05701 (rotated)

ZIP CODE 05701    MAILED FROM (rotated)

FIG. 3C

METHOD AND SYSTEM FOR RECOGNIZING CHARACTERS AND CHARACTER GROUPS IN ELECTRONICALLY REPRESENTED TEXT

BACKGROUND

The system and method of the present embodiment relate generally to automatically recognizing words or phrases in text.

Electronically represented text can be oriented in various ways and, in some cases, parts of the text can be inverted in relation to other parts of the text. One situation in which this can occur is when text is located in a roundel, which is a circle containing text. On a mail piece, a roundel can be located, for example, to the left of a permit block and can contain, for example, text written along an inside edge of the roundel. Additionally, there can be another circle just inside the text. Company name, city and state, or zip code information can be contained in the roundel instead of, for example, in the permit block. Roundels can include, for example, text written in a circle (see FIG. 2A), and text oriented so that it is never upside-down to the reader (see FIG. 2B). To electronically read a roundel, flipped regions of text in the roundel can be unflipped and then processed. Flipped regions are sections of text in which the characters in the section are rotated approximately 180° with respect to the conventional orientation of text.

SUMMARY OF THE INVENTION

The needs set forth above as well as further and other needs and advantages are addressed by the embodiments set forth below.

The present embodiment can automatically determine, for example, if regions in a roundel are improperly oriented, for example flipped, and then reorient them. The improperly oriented, for example, inverted or flipped, regions can be recognized and reoriented with the rest of the text in order to facilitate electronic character and character group recognition.

The present embodiment, a system for automatically recognizing characters and character groups in electronically represented text can include, but is not limited to including, a text selector for enabling selection of a region of the electronically represented text, a region analyzer for electronically analyzing the region to produce characters and character confidences, a character processor for selecting the characters associated with highest character confidence values of the character confidences, a possibility definer for determining electronic designations associated with a set of electronic patterns, a pattern locater for iteratively electronically marking, with the associated designations, the selected characters and the selected character groups that match the patterns, an image analyzer for creating an image of the region including the marked selected characters and the marked selected character groups chosen according to relative values of the associated designations, and for electronically analyzing the image to produce new characters each associated with new character confidences, and a provider for selecting final characters according to the associated new character confidences, and for providing the final characters to an electronic sink.

The method of the present embodiment for automatically recognizing characters and character groups in electronically represented text can include, but is not limited to including, the steps of: enabling selection of a region of the electronically represented text, electronically analyzing the region to produce characters and character confidences, selecting the characters associated with highest character confidence values of the character confidences, determining a set of electronic designations associated with electronic patterns, iteratively electronically marking, with the associated designations, the selected characters that match the patterns, creating an image of the region, if necessary, including the marked selected characters chosen according to relative values of the associated designations, electronically analyzing the image to produce new characters each associated with new character confidences, selecting final characters according to the associated new character confidences, and providing the final characters to an electronic sink.

The system and method of the present embodiment can differentiate characters or character groups that vary in orientation across a group of related characters, can identify key words, sections, or patterns that are indicative of flipped words, and can introduce an offset to the flipped and unflipped word confidence comparison. The system and method of the present embodiment also create an image for additional optical character recognition.

For a better understanding of the present embodiments, together with other and further objects thereof, reference is made to the accompanying drawings and detailed description.

DESCRIPTION OF THE SEVERAL VIEWS OF THE DRAWING

FIGS. 3A-3C are examples of text of various orientations, for example, flipped (FIG. 3B)

DETAILED DESCRIPTION OF THE INVENTION

The present embodiments are now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

Figure 1:
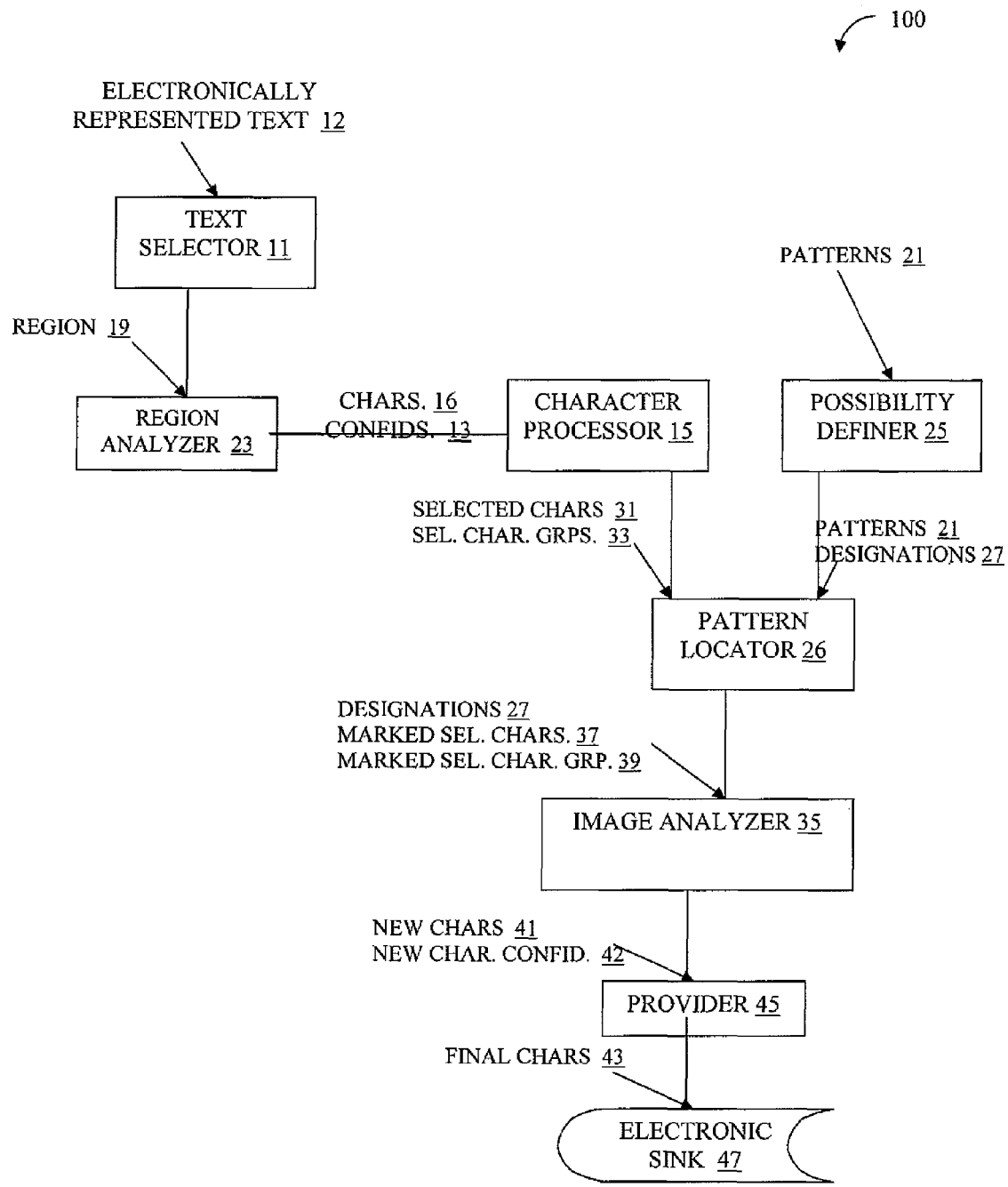
FIG. 1 is a schematic block diagram of the system of the present embodiment.
Figure 2A:
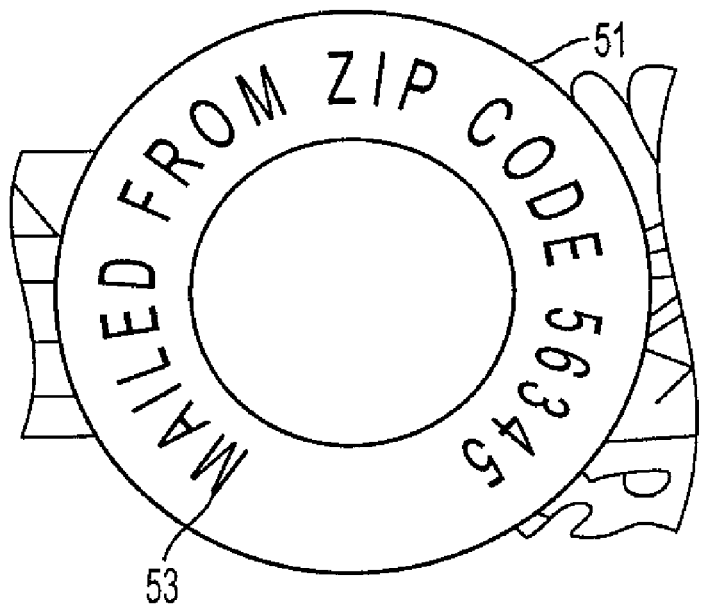
FIGS. 2A and 2B are examples of improperly oriented text in roundels.

Referring now primarily to FIG. 1, system 100 of the present embodiment can include, but is not limited to including, text selector 11 for enabling selection of region 19 of electronically represented text 12, and region analyzer 23 for electronically analyzing the region 19 to produce characters 16 and character confidences 13. System 100 can further include character processor 15 for selecting characters 16 associated with highest character confidence values of character confidences 13, and possibility definer 25 for determining electronic patterns 21 associated with electronic designations 27. System 100 can still further include pattern locater 26 for iteratively electronically marking, with associated designations 27, selected characters 31 and selected character groups 33 that match patterns 21, image analyzer 35 for creating image 61 of region 19 including marked selected characters 37 and marked selected character groups 39 chosen according to relative values of associated designations 27 and for electronically analyzing image 61 (FIG. 3C) to produce new characters 41 each associated with new character confidences 42. System 100 can even still further include provider 45 for selecting final characters 43 according to associated new character confidences 42 and for providing final characters 43 to electronic sink 47. In the present embodiment, electronically represented text 12 can be found in roundel image 51 (FIG. 2A). Character processor 15 can optionally compute character group confidences by summing the highest of character confidence values 13 for each selected character 31 that form the character groups, and can select the character groups with highest character group confidence values of the character group confidences as selected character groups 33.

Continuing to refer primarily to FIG. 1, system 100 can optionally include region analyzer 23 for vertically-aligning electronically represented text 12 in roundel image 51 (FIG. 2A), for determining point 53 (FIG. 2B) at which roundel image 51 (FIG. 2A) starts, for dividing roundel image 51 (FIG. 2A) into sections 55, 57 (FIG. 2B) according to point 53 (FIG. 2B), and for segmenting vertically-aligned text 59 (FIG. 3B) into characters 16. Pattern locator 26 can further optionally mark each selected character group 33 as flipped if selected character group 33 matches patterns 21, and mark selected character groups 33 in one of sections 55, 57 (FIG. 2B) as unflipped if none of selected character groups 33 in one section 55, 57 (FIG. 2B) is flipped, or if one section 55, 57 (FIG. 2B) includes predetermined text that is unflipped. Image analyzer 35 can further optionally create image 61 (FIG. 3C) by rearranging the underlying representation of flipped marked character groups 59 (FIG. 3B), if there are any flipped marked character groups 59 (FIG. 3B).

Figure 2B:
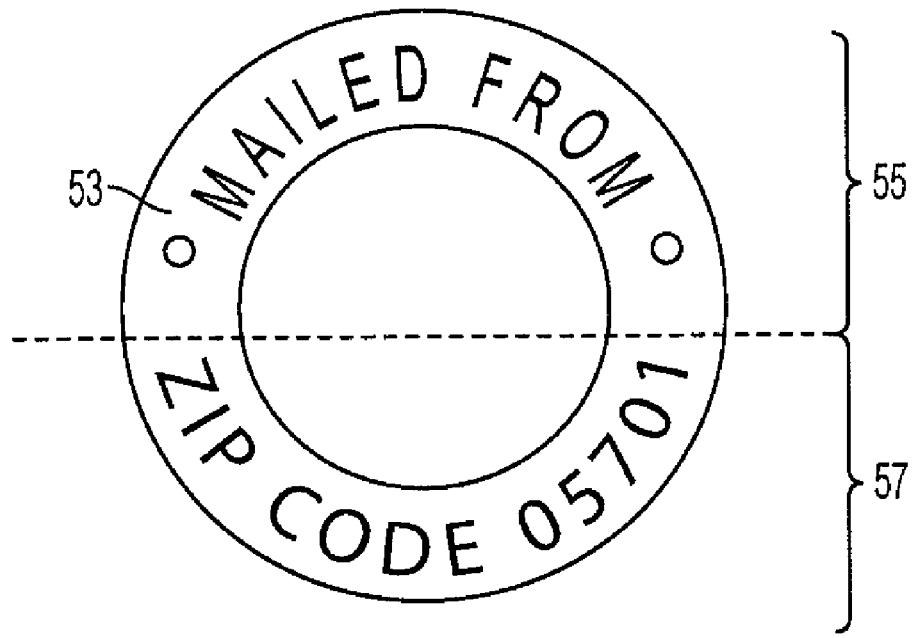

Continuing to still further refer primarily to FIG. 1, in an alternate embodiment, system 100 for providing characters 16 and character groups from roundel image 51 (FIG. 2A) can include, but is not limited to including, region analyzer 23 for vertically-aligning electronically represented text 59 (FIG. 3B) in roundel image 51 (FIG. 2A), for determining point 53 (FIG. 2B) at which roundel image 51 (FIG. 2A) starts, segmenting vertically-aligned text 59 (FIG. 3B) into characters 16 and character groups, and for dividing roundel image 51 (FIG. 2A) into sections 55, 57 (FIG. 2B) according to point 53 (FIG. 2B). System 100 can further include pattern locator 26 for marking each character group as flipped if the character group meets pre-determined criteria, and for marking the character groups in one of sections 55, 57 (FIG. 2B) as unflipped if none of the character groups in section 55, 57 (FIG. 2B) is flipped, or if one section 55, 57 (FIG. 2B) includes predetermined text that is unflipped. System 100 can even still further include image analyzer 35 for creating image 61 by rearranging the underlying representation of the character groups if there are character groups that are marked as flipped, and for segmenting image 61 (FIG. 3C) into new characters 41. System 100 can even still further include provider 45 for providing new characters 41 to electronic sink 47 according to the segmented image.

Figure 4A:
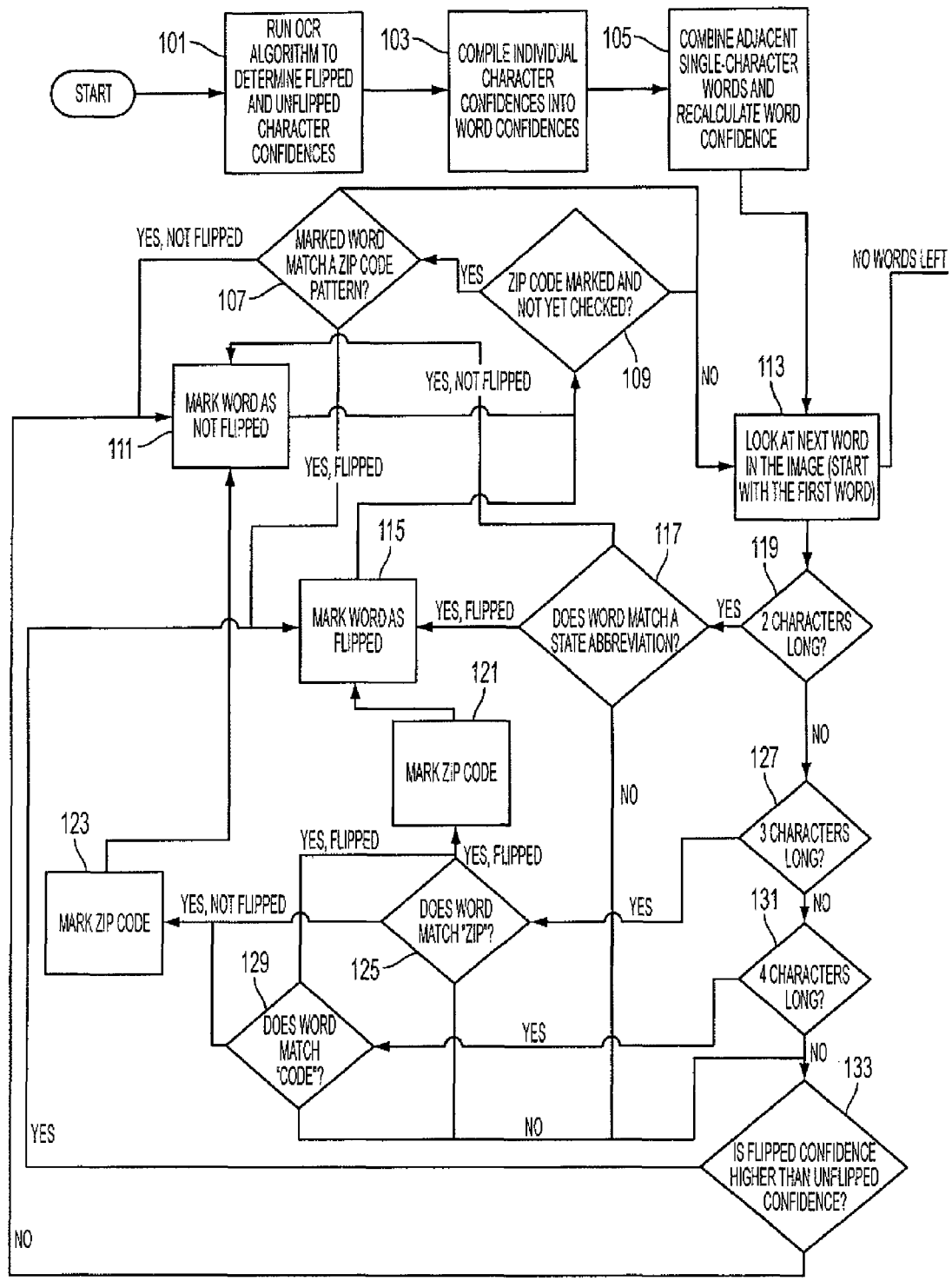
FIGS. 4A and 4B are flowcharts of a method of an embodiment according to the teachings stated herein.

Referring now to FIGS. 1 and 4A, system 100 (FIG. 4A) can optionally include character processor 15 (FIG. 1) for determining 101 (FIG. 4A) unflipped characters and unflipped character confidences for each character 16 (FIG. 1) in vertically-aligned electronically represented text 59 (FIG. 3B), for flipping 101 (FIG. 4A) characters 16 (FIG. 1), for determining 101 (FIG. 4A) flipped characters and flipped character confidences for the flipped characters, for selecting 101 (FIG. 4A) a set of character confidences 13 (FIG. 1) from the unflipped confidences and the flipped confidences according to predetermined criteria, for summing 103 (FIG. 4A) the set of character confidences 13 (FIG. 1) for each character 16 (FIG. 1) to compile a set of unflipped character group confidences, and for summing 103 (FIG. 4A) the set of flipped character confidences for each of the flipped characters to compile a set of flipped character group confidences. Character processor 15 (FIG. 1) can optionally combine 105 (FIG. 4A) adjacent characters 16 (FIG. 1) to form combined character groups, compute combined confidence values for each of the combined character groups, compute flipped combined confidence values for each of the flipped combined character groups based on the flipped character confidences, mark 115 (FIG. 4A) one the combined character groups as flipped after comparing if 133 (FIG. 4A) the flipped combined confidence value for the associated flipped combined character group is greater by a pre-determined amount than the combined confidence value for the corresponding character group, and perform pre-determined functions on the combined character groups according to the character length of the combined character groups.

Continuing to refer to FIGS. 1 and 4A, character processor 15 (FIG. 1) can further optionally compare 119 (FIG. 4A) the selected character groups 33 (FIG. 1), the combined character groups, the combined flipped character groups, and the flipped character groups that are two characters in length with pre-determined two-character character groups, unmark 111 (FIG. 4A) each of the flipped character groups and each of the combined flipped character groups if 117 (FIG. 4A) the corresponding selected character group 33 (FIG. 1) or the corresponding combined character group that matches one of the pre-determined two-character character groups, compare 127, 125 (FIG. 4A) selected character groups 33 (FIG. 1) that are three characters in length with pre-determined three-character character groups and predetermined flipped three-character character groups, compare 131, 129 (FIG. 4A) selected character groups 33 (FIG. 1) that are four characters in length with pre-determined four-character character groups and pre-determined flipped four-character character groups, establish a location and a content for a potential character group if there is a match found during the comparisons, combine characters 16 (FIG. 1) at the location of the potential character group to form a combined character group of pre-determined length, and mark 115 (FIG. 4A) the combined character group as flipped after comparing if 133 (FIG. 4A) a flipped alternate word confidence for the combined character group is greater by a pre-determined amount than an alternate character group confidence for the combined character group. Character processor 15 (FIG. 1) can optionally introduce an offset to the comparison.

Referring again to FIG. 1, the method of the present embodiment for automatically recognizing characters and character groups in electronically represented text 12 can include, but is not limited to including, the steps of enabling selection of region 19 of electronically represented text 12, and electronically analyzing region 19 to produce characters 16 and character confidences 13. The electronic analysis can be, for example, an Optical Character Reader (OCR) capability that returns, for example, a 3×3 matrix in which the first row represents the confidences for the top three lowercase character possibilities, the second row represents the confidences for the top three uppercase character possibilities, and the third row represents the confidences for the top three numeric possibilities. The method can further include the step of selecting characters 16 associated with highest character confidence values of character confidences 13. For example, from the matrix can be selected the character with the highest confidence. If a numeric value is expected, the character confidences are ignored and the top numeric confidence is chosen. The method can still further include the steps of determining electronic patterns 21 associated with electronic designations 27, iteratively electronically marking, with associated designations 27, selected characters 31 that match patterns 21, and creating image 61 of region 19, if necessary, including marked selected characters 37 chosen according to relative values of associated designations 27. Depending on patterns 21 selected or found, nothing may have changed from the original image, so it might not be necessary to create image 61 of region 19. The method can even still further include the steps of electronically analyzing image 61 to produce new characters 41 each associated with new character confidences 42, selecting final characters 43 according to associated new character confidences 42, and providing final characters 43 to electronic sink 47. Electronically represented text 12 can be roundel image 51.

Continuing to refer to FIG. 1, pattern matches can occur, for example, when electronically represented text 12 is right side up, or upside down, or in some other orientation. This information can be provided to system 100 through user input, or can be determined in another automated way. An embodiment of system 100 can iterate through each character group to find patterns that are indicative of flipped text. If a pattern match is found, text can be marked as either flipped or unflipped, wherein in the present embodiment, unflipped is chosen over flipped. However, for example, if flipped character groups are found and there are no definitively unflipped character groups in region 19, then region 19 is flipped. A character group can be found to be definitively flipped if, for example, the flipped character group confidence is much larger than the unflipped character group confidence. In the present embodiment, character confidence can range from, for example, 0-255. A confidence that is found to be "much larger" than another confidence can be larger by, for example, two, but can be any value. This process stated above is outlined below for the example of roundel processing.

Referring now primarily to FIGS. 2A, 2B, and 3A-3C, pattern locater 26 (FIG. 1) receives "unrolled" roundel text (FIGS. 3A-3C) in which the text is vertically-aligned, and point 53 (FIGS. 2A and 2B) which can be provided as a break point angle where the unrolled image starts and ends.

Referring now to FIG. 4A, the method of an exemplary embodiment is shown in flowchart format. An OCR algorithm is run 101 (FIG. 4A) on the unrolled roundel image. The OCR process can segment the unrolled roundel image into characters and character groups, and can return 103 (FIG. 4A) character possibilities and confidences in a 3×3 matrix for uppercase characters, lowercase characters, and numeric characters. The character possibilities can be returned for each character both as they appear in the image, and flipped (on a character-by-character basis). The highest-confidence characters can be taken from both the flipped and unflipped character records, and based on the character group segmentation. Character group confidence values can be compiled by summing character confidence values for each character in a character group. After character group confidences are compiled, each character group can be checked to determine whether or not it should be flipped. There can be, for example, a check for a split state abbreviation ("N Y", for example). In some situations, certain combinations can be ruled out. For example, if there is a very low possibility of having a single-character character group in a roundel, the character group list can be checked for two adjacent single-character character groups. If this situation is encountered, the two single-character character groups can be combined 105 (FIG. 4A) in the character group list into a single character group, and processing can continue starting at that character group. A check can be performed based on the confidence values for the flipped and unflipped character groups. If 133 (FIG. 4A) the confidence for the flipped character group is at least a predetermined amount higher, for example two higher, than the confidence for the unflipped character group (where confidence for each character is on a scale of 0-255), then the character group can be marked 115 (FIG. 4A) as being flipped.

Continuing to refer to FIG. 4A, specific processing can be done for character groups that are two, three, or four characters long 119, 127, 131 (FIG. 4A). Because of the nature of postal service roundels, finding a state abbreviation, or either of the character groups "zip" 125 (FIG. 4A) or "code" 129 (FIG. 4A) can suggest that sections of the image are either flipped or not flipped, depending on the orientation in which they are found. Two-character character groups can be checked 117 (FIG. 4A) against all known state abbreviations, both flipped and unflipped. If a character group that has been marked as flipped based on character group confidence is found to match a state abbreviation when not flipped, then that mark is removed. Similarly, if a character group is not yet flipped, but matches a state abbreviation when it is flipped, then it is now marked as being flipped. This sort of overriding previous decisions holds for all the processing based on character group length. Three-character character groups are checked 125 (FIG. 4A) to see if they match the character group "ZIP" either unflipped or flipped. For both three- and four-character character groups, the unflipped character group can be checked against possible flipped and unflipped characters. For example, for a flipped version of the character group "ZIP", the characters can be checked to see if they match 'd' for the first character of the character group; 'I', '1', 't', or 'r' for the second character of the character group; and 'Z', 'z', '2', or '7' for the last character of the character group. For an unflipped version of the character group "ZIP", the characters can be checked to see if they match 'Z', 'z', '2', or '7' for the first character of the character group; 'I', 'i', 'L', '1', or 't' for the second character of the character group; and 'P', 'p', 'F', or 'b' for the last character of the character group. These characters can be chosen, for example, based on observations of neural net outputs from an OCR. Four-character character groups can be checked 129 (FIG. 4A) for possible patterns. For a flipped match of the character group "CODE", for example, the characters checked can be, but are not limited to being, 1: '3', 2: '0', 'O', 'o', 'a', 3: '0', 'O', 'o', 'D', and 4: '0', 'O', 'o', 'D', '3', '9'. For an unflipped match of the character group "CODE", the characters checked can be, but are not limited to being, 1: 'C', 'c', '0', 'O', 'o', 2: '0', 'O', 'o', '8', 'U', 3: 'D', '0', 'O', 'o', 'E', 'B', and 4: 'E', 'C.' When either the character group "ZIP" or "CODE" is found, another character group can be marked as likely being the zip code in the roundel. In the case of the character group "ZIP," the character group marked can be two-off, either two character groups later if "ZIP" is found unflipped, or two before if it is found flipped. In the case of the character group "CODE," the character group marked can be one-off.

Figure 4B:
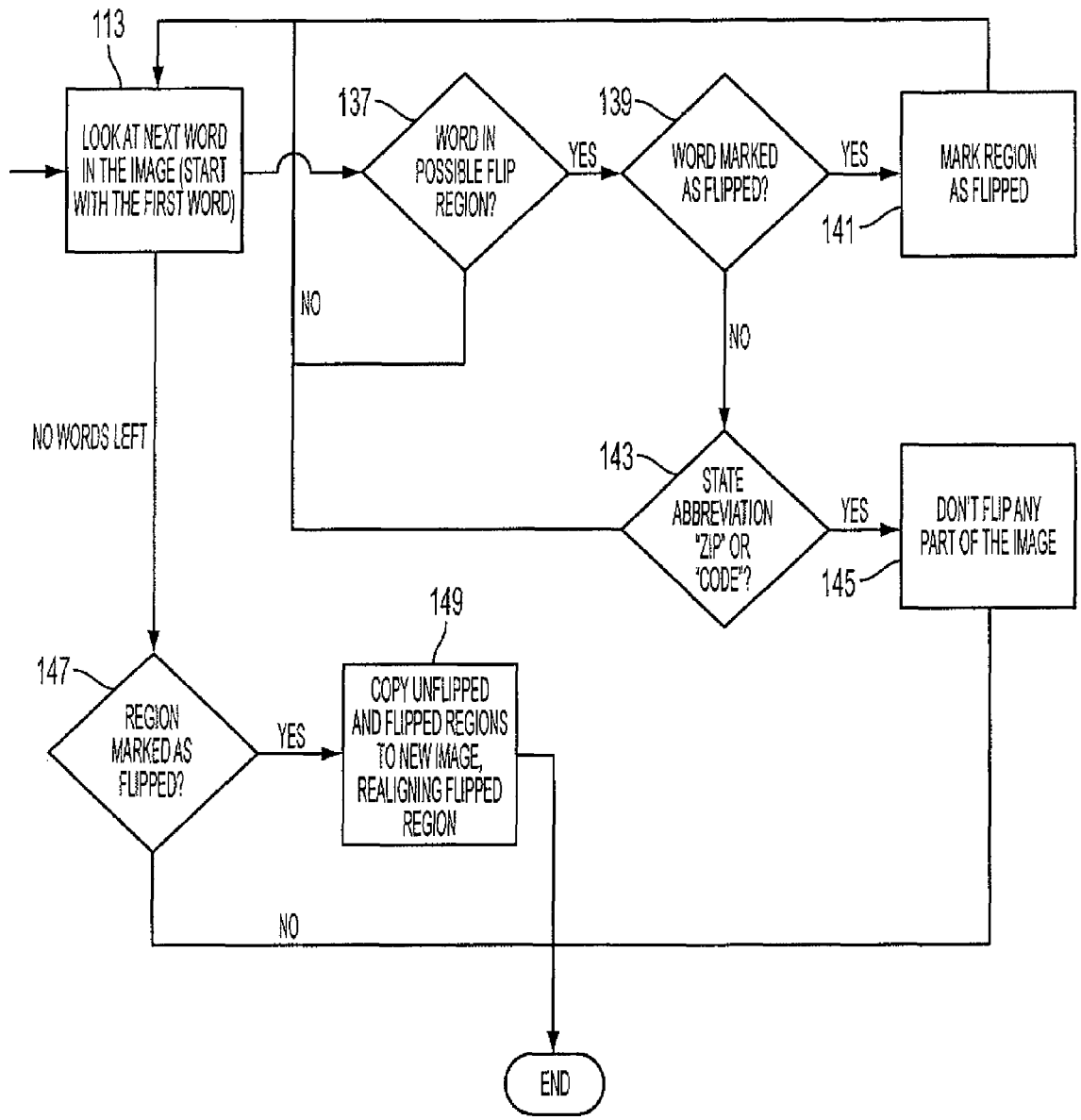

Referring primarily to FIG. 4B, if 107 a character group is marked as likely being the zip code, then the length of that character group can be checked. If the character group is five-characters long, processing continues; however, if the character group is not five-characters long, the surrounding character groups can be checked to see if they can be combined to make a five-character character group. For example, consecutive character groups could have character lengths of 2-2-1, 4-1, 3-2, etc. So long as there are no more than three character groups at the zip code point that can be combined to form a five-character character group, they can be combined into a single character group before processing. When processing a zip code, a new character group confidence can be calculated based on the numeric confidence values returned by the original OCR process. Using the same technique of summing the confidences of each character in the character group, a numeric character group confidence and flipped numeric character group confidence can be calculated. If the flipped confidence is higher than the unflipped confidence, then the zip code character group is flagged as being flipped. After the character groups are inspected, the image can be divided into two sections based on point 53 (FIG. 2A). One section can be, for example, a section that can be along the bottom 57 (FIG. 2B) of roundel 51 (FIG. 2A), and another section can be, for example, a section that is along the top 55 (FIG. 2B) of roundel 51 (FIG. 2A). Bottom section 57 (FIG. 2B) of roundel 51 (FIG. 2A) in its entirety can be unrolled 59 (FIG. 3B) and flipped. Thus, either all the character groups in bottom section 57 (FIG. 2B) can be flipped or none are flipped. If any flipped character group is found in bottom section 57 (FIG. 2A), then all character groups there are marked 141 (FIG. 4B) as being flipped. However, if 143 (FIG. 4B) a state abbreviation, "ZIP", or "CODE" are found unflipped in the bottom region, then roundel 51 (FIG. 2A) can be marked 145 (FIG. 4B) as unflipped. The state of not being flipped can override the state of being flipped, so that if one character group is determined to be flipped in bottom region 57 (FIG. 2B), but a state abbreviation, "ZIP", or "CODE" is found unflipped, then region 19 can be marked as unflipped. Each character group can be marked individually 141 (FIG. 4B) as being flipped or not flipped based on whether bottom region 57 (FIG. 2B) is found to be flipped, and whether or not the character group lies in bottom region 57 (FIG. 2B) and can be processed at another time.

Continuing to refer primarily to FIG. 4B, if it is decided that there are flipped character groups in roundel 51 (FIG. 2A), then roundel 51 (FIG. 2A) can be reprocessed to compute a new OCR run. In order to do this, image 61 can be created 149 (FIG. 4B) that can be submitted to the OCR process, or submitted to an alternate OCR process at a later time. To create image 61, system 100 (FIG. 1) can iterate through a character group array containing the character groups. At each character group break, the distance between character groups can be summed. Also, two regions can be built based on, for example, whether or not character groups are flipped—a flipped region and an unflipped region. Any statistics such as size of the original image regions can be used when copying the data from the original image to image 61. After system 100 has iterated through the character groups, an average distance between character groups can be calculated. A memory buffer can be allocated such that it is large enough to hold the flipped and unflipped regions, and a certain number of spaces, for example three, equal to the average distance between character groups. The unflipped region can be copied directly from the image in memory into the new buffer, starting one character group space from the edge of the image. The flipped region can be copied, for example, a byte at a time, one character group space from the end of the first region. The bytes can be flipped as they are copied (the original image is assumed to be one-bit packed, so eight pixels are stored per byte). Bytes can be flipped and placed in opposite corners of the buffer from where they were in the original image memory, thus flipping that section of the image as it is copied. The image buffer can be sent back into an OCR algorithm after copying is complete, thus completing character group recognition of roundel 51 (FIG. 2A).

The methods of the present embodiments can be, in whole or in part, implemented electronically. Signals representing actions taken by elements of system 100 (FIG. 1) can travel over electronic communications media. Control and data information can be electronically executed and stored on computer-readable media. The system can be implemented to execute on a node in a communications network. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, an EPROM, a FLASH-EPROM, or any other memory chip or cartridge, a carrier wave, or any other medium from which a computer can read.

Although the invention has been described with respect to various embodiments, it should be realized this invention is also capable of a wide variety of further and other embodiments.

What is claimed is:

1. A method for automatically recognizing characters and character groups in electronically represented text comprising the steps of:
    enabling selection of a region of the electronically represented text; wherein the electronically represented text comprises a roundel image;
    electronically analyzing the region to produce characters and character confidences;
    selecting the characters associated with highest character confidence values of the character confidences;
    ascertaining electronic designations associated with a set of electronic patterns;
    iteratively electronically marking, with the associated designations, the selected characters that match the electronic patterns;
    creating an image of the region, if necessary, including the marked selected characters chosen according to relative values of the associated designations;
    electronically analyzing the image to produce new characters each associated with new character confidences;
    selecting final characters according to the associated new character confidences; and
    providing the final characters to an electronic sink.

2. The method as in claim 1 further comprising the steps of:
    computing character group confidences by summing the highest character confidence values for each of the selected characters that form the character groups;
    selecting the character groups with highest character group confidence values of the character group confidences as the selected character groups;
    vertically-aligning the electronically represented text in the roundel image;
    determining a point at which the roundel image starts;
    dividing the roundel image into sections according to the point;
    segmenting the vertically-aligned text into the characters;
    wherein the step of iteratively marking with associated designations includes the steps of
        marking each of the selected character groups as flipped if the selected character group matches the patterns; and
        marking the selected character groups in one of the sections as unflipped if none of the selected character groups in the one section is flipped, or if the one section includes predetermined text that is unflipped; and
    if there are the flipped marked character groups, creating the image by rearranging the underlying representation of the flipped marked character groups.

3. A method for providing characters and character groups from a roundel image comprising the steps of:
    vertically-aligning a region of electronically represented text in the roundel image;

determining a point at which the roundel image starts;
electronically analyzing the region to produce characters and character confidences; dividing the roundel image into sections according to the point;
selecting the characters associated with highest character confidence values of the character confidences;
computing character group confidences by summing the highest character confidence values for each of the selected characters that form the character groups;
selecting the character groups with highest character group confidence values of the character group confidences as the selected character groups;
marking each of the selected character groups as flipped;
creating flipped marked character groups if the selected character group meets pre-determined criteria;
marking each of the selected character groups in one of the sections as unflipped if none of the selected character groups in the one section is flipped, or if the one section includes predetermined text that is unflipped;
if there are the flipped marked character groups, creating an image by rearranging the underlying representation of the flipped marked character groups;
electronically analyzing the image to produce new characters each associated with new character confidences;
selecting final characters according to the associated new character confidences; and
providing the final characters to an electronic sink.

4. The method as in claim 3 further comprising the steps of:
determining unflipped characters and unflipped character confidences for each character in the vertically-aligned electronically represented text;
flipping the characters;
determining flipped characters and flipped character confidences for the flipped characters;
selecting a set of character confidences from the unflipped confidences and the flipped confidences according to predetermined criteria;
summing the set of character confidences for each of the characters to compile a set of unflipped character group confidences; and
summing the set of flipped character confidences for each of the flipped characters to compile a set of flipped character group confidences.

5. The method as in claim 3 wherein said step of marking each of the selected character groups as flipped comprises the steps of:
combining adjacent characters to form combined character groups;
computing combined confidence values for each of the combined character groups;
computing flipped combined confidence values for each of the flipped combined character groups;
marking one the combined character groups as flipped after comparing if the flipped combined confidence value for the associated flipped combined character group is greater by a pre-determined amount than the combined confidence value for the corresponding character group; and
performing pre-determined functions on the combined character groups according to the character length of the combined character groups.

6. The method as in claim 5 wherein said step of marking one of the combined characters comprises the step of:
introducing an offset to the comparison.

7. The method as in claim 5 wherein said step of performing pre-determined functions on the combined characters and character groups comprises the steps of:
(a) comparing the selected character groups, the combined character groups, the combined flipped character groups, and the flipped character groups that are two characters in length with pre-determined two-character character groups;
(b) unmarking each of the flipped character groups and each of the combined flipped character groups if the corresponding character groups or the corresponding combined character groups match one of the pre-determined two-character character groups;
(c) comparing the character groups that are three characters in length with pre-determined three-character character groups and pre-determined flipped three-character character groups;
(d) comparing the character groups that are four characters in length with pre-determined four-character character groups and pre-determined flipped four-character character groups;
(e) establishing a location and a content for a potential character group if there is a match found during steps (c) or (d);
(f) combining characters at the location of the potential character groups to form a combined character group of pre-determined length; and
(g) marking the combined character group as flipped if a flipped alternate character group confidence for the combined character group is greater by a pre-determined amount than an alternate character group confidence for the combined character group.

8. A system for automatically recognizing characters and character groups in electronically represented text comprising:
a text selector for enabling selection of a region of the electronically represented text; wherein the electronically represented text comprises a roundel image;
a region analyzer for electronically analyzing the region to produce characters and character confidences;
a character processor for selecting the characters associated with highest character confidence values of the character confidences;
a possibility definer for ascertaining electronic designations associated with a set of electronic patterns;
a pattern locater for iteratively electronically marking, with the associated designations, the selected characters that match the patterns;
an image analyzer for
creating an image of the region including the marked selected characters chosen according to relative values of the associated designations; and
electronically analyzing the image to produce new characters each associated with new character confidences; and
a provider for
selecting final characters according to the associated new character confidences; and
providing the final characters to an electronic sink.

9. The system as in claim 8 further comprising:
wherein said character processor further
computes character group confidences by summing the highest character confidence values for each of the selected characters that form the character groups; and selects the character groups with highest character group confidence values of the character group confidences as the selected character groups; and a region analyzer for vertically-aligning the electronically represented text in the roundel image;

determining a point at which the roundel image starts;

dividing the roundel image into sections according to the point;

segmenting the vertically-aligned text into the characters;

wherein said pattern locator further marks each of the selected character groups as flipped if the selected character group matches the patterns; and marks the selected character groups in one of the sections as unflipped if none of the selected character groups in the one section is flipped, or if the one section includes predetermined text that is unflipped; and wherein said image analyzer further creates the image by rearranging the underlying representation of the flipped marked character groups, if there are the flipped marked character groups.

10. A system for providing characters and character groups from a roundel image comprising:

a region analyzer for vertically-aligning electronically represented text in said roundel image;

determining a point at which said roundel image starts;

segmenting the vertically-aligned text into characters and character groups; and dividing said roundel image into sections according to said point;

a pattern locater marking each of said character groups as flipped if said character group meets pre-determined criteria; and marking said character groups in one of said sections as unflipped if none of said character groups in said one section is flipped, or if said one section includes pre-determined text that is unflipped; and an image analyzer creating an image by rearranging the underlying representation of said character groups if there are said character groups that are marked as flipped; and segmenting said image into new characters; and a provider for providing the new characters to an electronic sink according to the segmented image.

11. The system as in claim 10 further comprising:

a character processor for determining unflipped characters and unflipped character confidences for each character in the vertically-aligned electronically represented text;

flipping the characters;

determining flipped characters and flipped character confidences for the flipped characters;

selecting a set of character confidences from the unflipped confidences and the flipped confidences according to predetermined criteria;

summing the set of character confidences for each of the characters to compile a set of unflipped character group confidences; and summing the set of flipped character confidences for each of the flipped characters to compile a set of flipped character group confidences.

12. The system as in claim 10 wherein said character processor further:

combines adjacent characters to form combined character groups;

computes combined confidence values for each of the combined character groups;

computes flipped combined confidence values for each of the flipped combined character groups based on the flipped character confidences;

marks one the combined character groups as flipped after comparing if the flipped combined confidence value for the associated flipped combined character group is greater by a pre-determined amount than the combined confidence value for the corresponding character group; and performs pre-determined functions on the combined character groups according to the character length of the combined character groups.

13. The system as in claim 12 character processor:

(a) compares the selected character groups, the combined character groups, the combined flipped character groups, and the flipped character groups that are two characters in length with pre-determined two-character character groups;

(b) unmarks each of the flipped character groups and each of the combined flipped character groups if the corresponding selected character group or the corresponding combined character group matches one of the pre-determined two-character character groups;

(c) compares the selected character groups that are three characters in length with pre-determined three-character character groups and pre-determined flipped three-character character groups;

(d) compares the selected character groups that are four characters in length with pre-determined four-character character groups and pre-determined flipped four-character character groups;

(e) establishes a location and a content for a potential character group if there is a match found during steps (c) or (d);

(f) combines the characters at the location of the potential character group to form a combined character group of pre-determined length; and (g) marks the combined character group as flipped after comparing if a flipped alternate word confidence for the combined character group is greater by a pre-determined amount than an alternate character group confidence for the combined character group.

14. The system as in claim 13 wherein said character processor further introduces an offset to the comparison.

15. A computer node in a communications network executing instructions for carrying out the method of claim 1.

16. A non-transitory computer readable medium executing instructions for carrying out the method of claim 1.

* * * * *